(12) United States Patent
Liu et al.

(10) Patent No.: US 11,334,367 B2
(45) Date of Patent: *May 17, 2022

(54) PLACEHOLDER BOOT OPTION AND BOOT OPTION REPLACEMENT SYSTEM

(71) Applicant: Dell Products L.P., Round Rock, TX (US)

(72) Inventors: Wei Liu, Austin, TX (US); Mark W. Shutt, Austin, TX (US); Tzu-Hsiu Tsai, Zhongshan District (TW); Mukund P. Khatri, Austin, TX (US); Richard Louis Holmberg, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,812

(22) Filed: Feb. 10, 2021

(65) Prior Publication Data

US 2021/0165663 A1 Jun. 3, 2021

Related U.S. Application Data (63) Continuation of application No. 15/970,689, filed on May 3, 2018, now Pat. No. 10,942,751.

(51) Int. Cl.
*G06F 9/44* (2018.01)
*G06F 9/4401* (2018.01)
*G06F 8/61* (2018.01)

(52) U.S. Cl.
CPC ............. *G06F 9/4416* (2013.01); *G06F 8/61* (2013.01); *G06F 9/4406* (2013.01); *G06F 9/4411* (2013.01)

(58) Field of Classification Search
None
See application file for complete search history.

(56) References Cited

U.S. PATENT DOCUMENTS 6,980,239 B1 * 12/2005 Motta ................. H04N 5/23245
348/211.6
2003/0233535 A1 12/2003 Nunn et al.
(Continued)

OTHER PUBLICATIONS

"UEFI Deployment Guide for HPE ProLiant Gen9 and Synergy Servers," Hewlett Packard Enterprise, Dec. 2016, 51 Pages, Part No. 814283-005, Edition 1, https://support.hpe.com/hpsc/doc/public/display?docId=c04565930.

*Primary Examiner* — Danny Chan
(74) *Attorney, Agent, or Firm* — Joseph Mencher (57) ABSTRACT

A boot option system includes a pre-boot execution environment system coupled to a server device through a network. The server device creates a device placeholder boot option including a device path terminating at a storage controller in the server device. During a first boot and based on first boot instructions received from the pre-boot execution environment system, the server device moves the device placeholder boot option to a desired location within a boot sequence for the server device. During a second boot and based on second boot instructions received from the pre-boot execution environment system, the server device provides an operating system on the server device. The server device then replaces, at the desired location within the boot sequence, the device placeholder boot option with an operating system boot option that was provided on the server device in response to the provisioning of the operating system on the server device.

20 Claims, 7 Drawing Sheets

(56) References Cited

U.S. PATENT DOCUMENTS

| | | |
|---|---|---|
| 2004/0215949 A1 | 10/2004 | Dennis et al. |
| 2009/0113195 A1 | 4/2009 | Mohrmann et al. |
| 2013/0117427 A1* | 5/2013 | Amano ................... H04L 61/20 709/223 |
| 2017/0147361 A1* | 5/2017 | Kirvan ................... G06F 9/4406 |
| 2019/0281012 A1 | 9/2019 | Nishikata |

* cited by examiner

PLACEHOLDER BOOT OPTION AND BOOT OPTION REPLACEMENT SYSTEM

CROSS-REFERENCE TO RELATED APPLICATIONS

The present disclosure is a continuation of U.S. patent application Ser. No. 15/970,689, filed on May 3, 2018, the disclosure of which is incorporated by reference herein in its entirety.

BACKGROUND

The present disclosure relates generally to information handling systems, and more particularly to modifying boot options in a boot sequence for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server devices, are now booted or otherwise initialize according to the Universally Extensible Firmware Interface (UEFI) specification. The UEFI specification defines a process for automatically adding boot options for a fixed disk or other fixed media (i.e., hard drives or other storage media that are internal to the chassis of the server device such that they cannot be easily removed.) For example, Boot Device Selection (BDS) code executed by the UEFI subsystem in the server device provides for a determination of the presence of boot loader files (e.g., an EFI/Boot/BootX64.efi file) in a fixed disk included in the server device, which requires boot loader files to be present in that fixed disk in order for their associated boot options to be available. Conventional operating system installers operate to create a boot option after operating system installation, and then move that boot option to the top of the boot sequence for the server device so that the server device will automatically boot using that boot option on subsequent boots. Such conventional operations work well with local operating system installation, but present issues with data centers that utilize Preboot Execution Environments (PXEs) that allow networked server devices that are not yet loaded with an operating system to be configured and booted remotely by a data center administrator. For example, a data center utilizing a PXE and server devices in a UEFI boot mode cannot operate according to the UEFI specification to set predetermined boot orders in those server devices before an operating system is installed, because there will not be a boot option for the for the server device storage system (e.g., provided by Redundant Array of Independent Disk (RAID) volumes) prior to the operating system installation.

Accordingly, it would be desirable to provide an improved boot option modification system.

SUMMARY

According to one embodiment, an Information Handling System (IHS) includes a storage controller; a processing system that is coupled to the storage controller; and a memory system that is coupled to the processing system and that includes instructions that, when executed by the processing system, cause the processing system to provide an Universally Extensible Firmware Interface (UEFI) engine that is configured to: create a device placeholder boot option that includes a device path terminating at a storage controller; move, during a first boot and based on first boot instructions, the device placeholder boot option to a desired location within a boot sequence; provide, during a second boot that is subsequent to the first boot and based on second boot instructions, an operating system on a storage system that is coupled to the storage controller; and replace, at the desired location within the boot sequence, the device placeholder boot option with an operating system boot option that was provided on the storage system in response to the provisioning of the operating system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
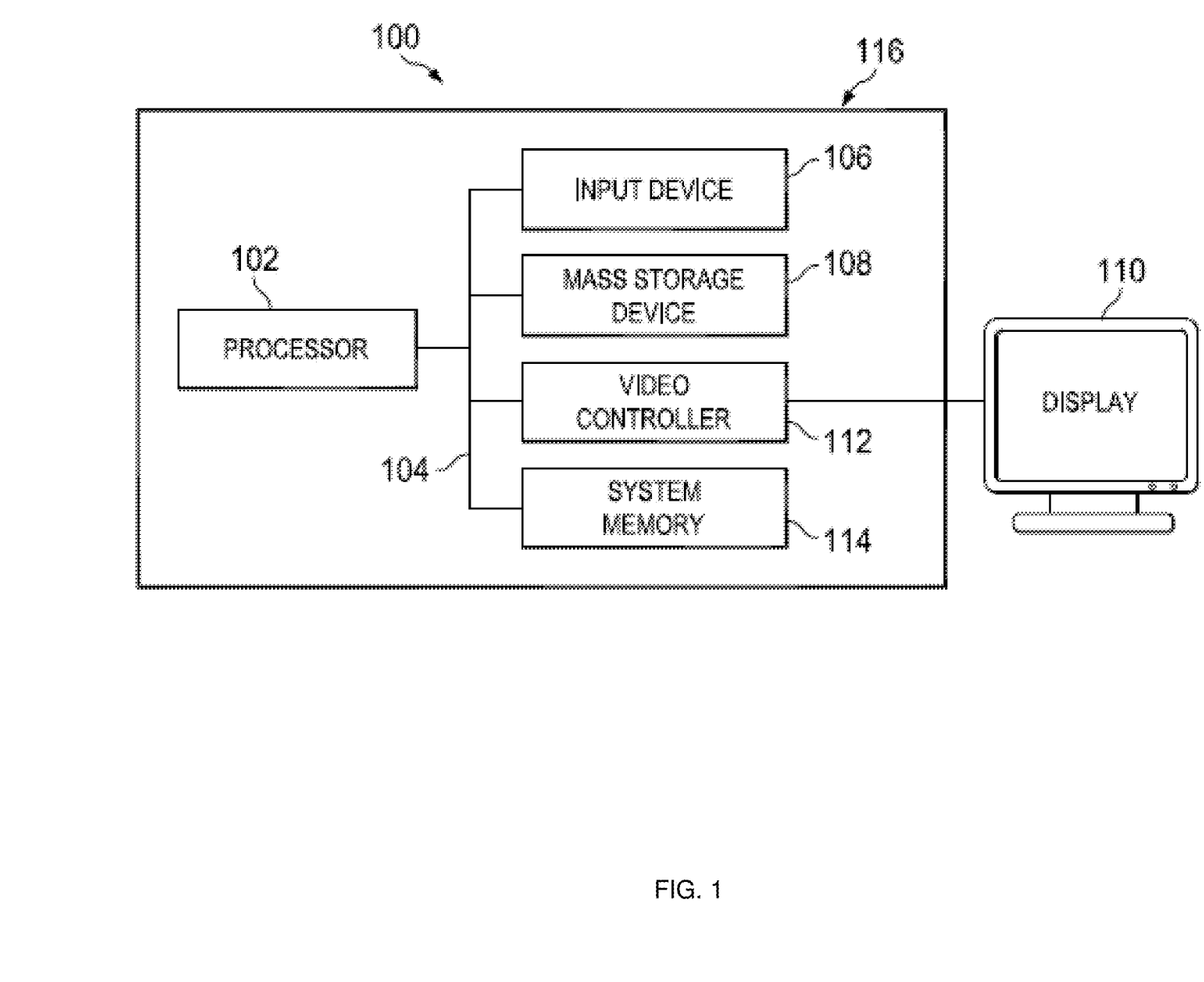
FIG. 1 is a schematic view illustrating an embodiment of an Information Handling System.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
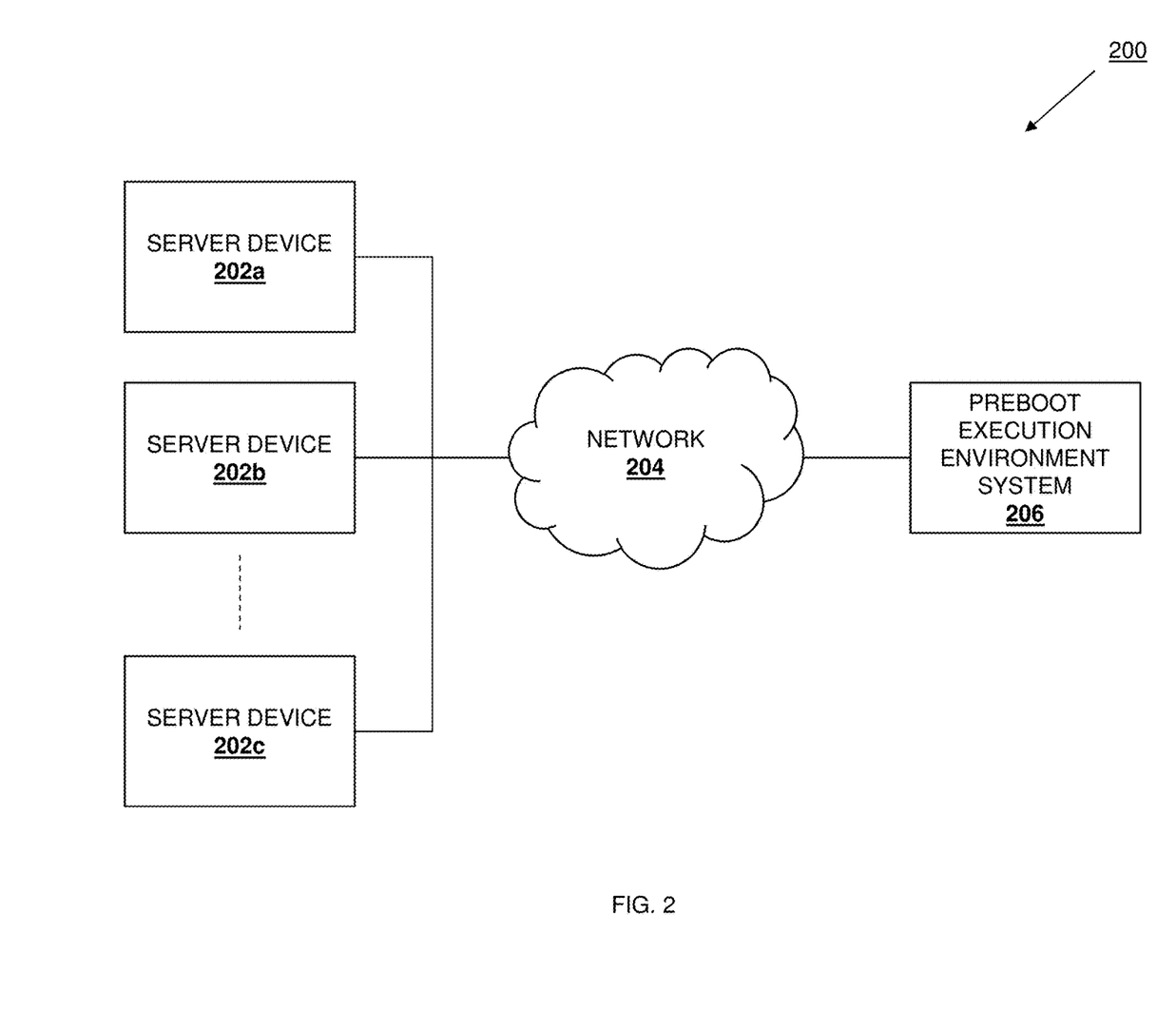
FIG. 2 is a schematic view illustrating an embodiment of a boot option modification system.

Referring now to FIG. 2, an embodiment of a boot option modification system 200 is illustrated. While the illustrated embodiment is described as utilized with computing devices that operate in a UEFI boot mode, one of skill in the art in possession of the present disclosure will recognize that computing devices utilizing different types of a Basic Input/Output System (BIOS) may benefit from the teachings of the present disclosure and thus will fall within the scope of the present disclosure as well. In the illustrated embodiment, the boot option modification system 200 includes a plurality of server devices 202a, 202b, and up to 202c. In an embodiment, any or all of the server devices may be provided by the information handling system 100 discussed above with reference to FIG. 1, and/or may include some or all of the components of the IHS 100. Furthermore, while illustrated and described as server devices, in some embodiments the server devices 202a-c may be replaced by networking devices (e.g., switches), storage systems, desktop computing devices, laptop computing devices, and/or a variety of other computing devices that would be apparent to one of skill in the art in possession of the present disclosure. Each of the server devices 202a-c is coupled to a network 204, which in the embodiment discussed below is described as being provided by a Local Area Network (LAN). However, other networks (e.g., wireless networks, the Internet, etc.) may be utilized in providing the network 204 while remaining within the scope of the present disclosure as well.

In the illustrated embodiment, a Pre-boot eXecution Environment (PXE) system 206 is coupled to the network 204. As would be understood by one of skill in the art in possession of the present disclosure, the PXE system 206 may include one or more servers that provide a client/server environment (with the server devices 202a-c acting as the clients, and the PXE system 206 acting as the server) that is configured to allow the server devices 202a-c to receive a software assembly from the PXE system 206 through the network 204 and boot from that software assembly. As such, in order to boot, the server devices 202a-c only require a PXE capable Network Interface Controller (NIC), along with a relatively small set of industry-standard network protocols (e.g., the Dynamic Host Configuration Protocol (DHCP), the Trivial File Transfer Protocol (TFTP), etc.) While one of skill in the art will recognize that the PXE is part of the UEFI standard and a common option for operating system booting, installation, and deployment, other network-based boot enablement systems utilized with other BIOS-enabled computing devices may benefit from the teachings of the present disclosure and thus will fall within its scope as well. While a specific boot option modification system 200 has been described, one of skill in the art in possession of the present disclosure will recognize that boot option modification systems may include other devices and/or other device configurations while remaining within the scope of the present disclosure as well.

Figure 3:
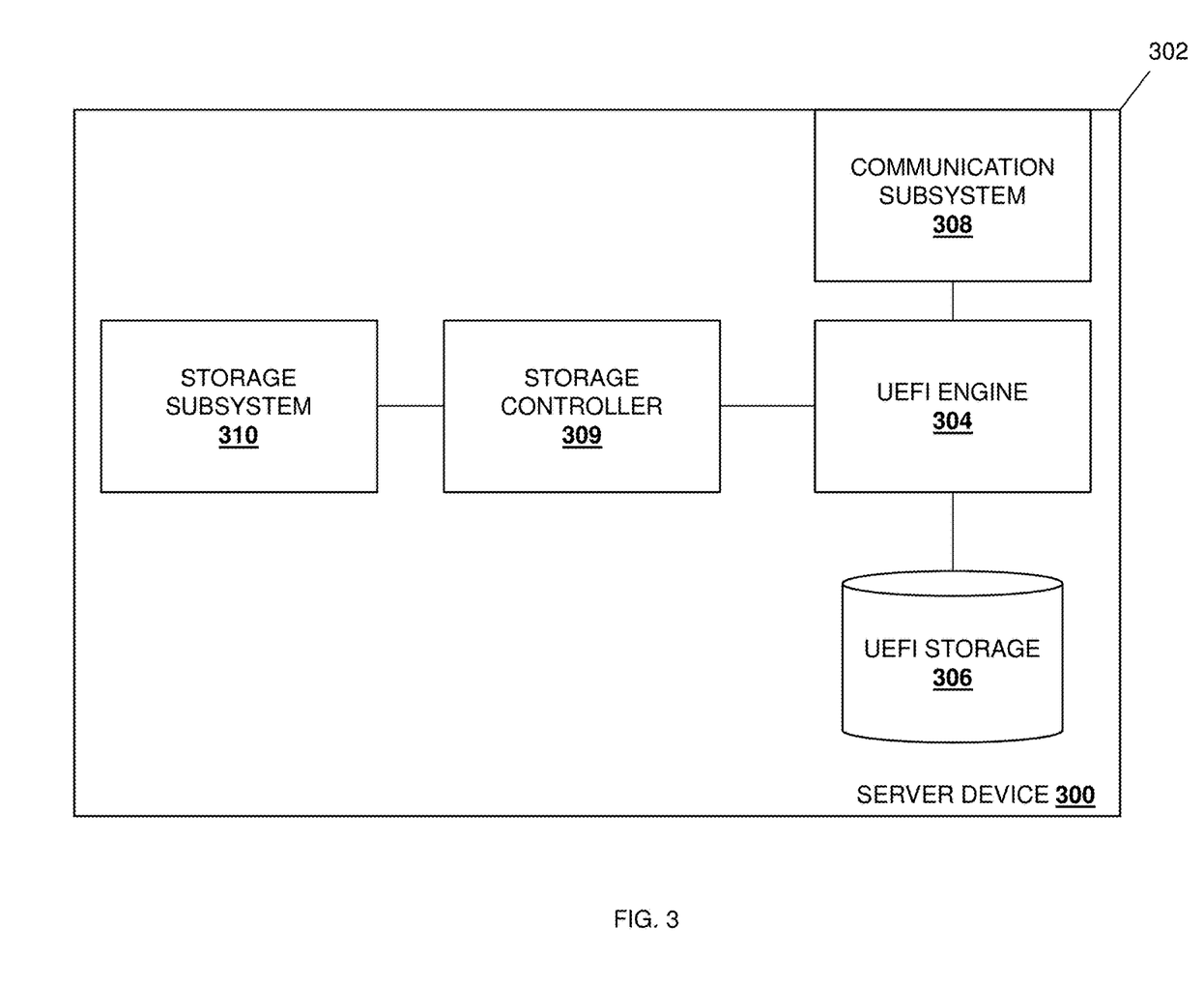
FIG. 3 is a schematic view illustrating an embodiment of a server device included in the boot option modification system.

Referring now to FIG. 3, an embodiment of a server device 300 is illustrated that may be any of the server devices 202a-c discussed above with reference to FIG. 2. As such, the server device 300 may be provided by the IHS 100 discussed above with reference to FIG. 1, and/or may include some or all of the components of the IHS 100. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a UEFI engine 204 that is configured to perform the functions of the UEFI engines and server devices discussed below. In an embodiment, the UEFI engine 304 may be provided by UEFI firmware that is configured to provide an interface between an operating system (when that operating system is provided on the server device 300) and server firmware and/or other hardware in the server device 300. As discussed above, while the engine 304 is illustrated and described as a UEFI engine, one of skill in the art in possession of the present disclosure will recognize that computing devices utilizing different types of BIOS engines may benefit from the teachings of the present disclosure, and thus the engine 304 may be provided by a BIOS engine or other processor/memory enabled engines while falling within the scope of the present disclosure as well. Furthermore, some functionality of the UEFI engine 304 discussed below may be performed by an operating system, or via cooperation between a UEFI/BIOS engine and an operating system, while remaining within the scope of the present disclosure.

The chassis 302 may also house a UEFI storage 306 that is coupled to the UEFI engine 304 (e.g., via a coupling between the processing system and the UEFI storage 306). While illustrated as separate, one of skill in the art in possession of the present disclosure will recognize that the UEFI storage 306 may be provided by a database or other data structure that is included in the UEFI firmware while remaining within the scope of the present disclosure. As discussed below, the UEFI storage 306 may store a boot sequence for the server device 300 that includes boot option(s), although the storage of other data and/or information in the UEFI storage 306 will fall within the scope of the present disclosure as well. The chassis 302 may also house a communication subsystem 308 that is coupled to the UEFI engine 304 (e.g., via a coupling between the processing system and the communication subsystem 308) and that, in the embodiments illustrated and discussed below, is provided by a PXE-enabled Network Interface Controller (NIC) that may be configured to communicate with the PXE system 206 (e.g., via DHCP, TFTP, etc.). However, other communication subsystems and/or components (e.g., wireless communication subsystems such as BLUETOOTH®, Near Field Communication (NFC), etc.) may be utilized to provide the communications subsystem while remaining within the scope of the present disclosure.

The chassis 302 may also house a storage controller 309 that is coupled to the UEFI engine 304 (e.g., via a coupling between the processing system and the storage controller 309), and that may be provided by a Redundant Array of Independent Disks (RAID) controller or other storage device array controller that is configured to manage physical storage devices and present them to the UEFI engine 304 (as well as an operating system when that operating system is provided on the server device 300) as a virtual disk, logical units, and/or other disk array elements. As such, the storage controller 309 may include a disk cache, an interconnect between the storage controller 309 and the server device 300 (e.g., the Peripheral Component Interconnect (PCI) node on the RAID storage controller discussed below), and/or any other storage controller components that would be apparent to one of skill in the art in possession of the present disclosure. In the illustrated embodiment, the storage controller 309 is illustrated as coupled to a storage subsystem 310. In the embodiments discussed below, the storage subsystem 310 is provided by a RAID storage subsystem including a plurality of storage devices, although other storage systems and/or storage devices may fall within the scope of the present disclosure as well. Furthermore, as discussed below, in some embodiments the storage subsystem 310 may be provided in the server device 300 and coupled to the storage controller 309 during the method 400, and thus may not be included in the chassis 302 at the beginning of the method 400. While a specific server device 300 has been illustrated and described, one of skill in the art in possession of the present disclosure will recognize that server devices may include different components and/or component configurations for providing conventional server device functionality, as well as the functionality discussed below, while remaining within the scope of the present disclosure as well.

Figure 4:
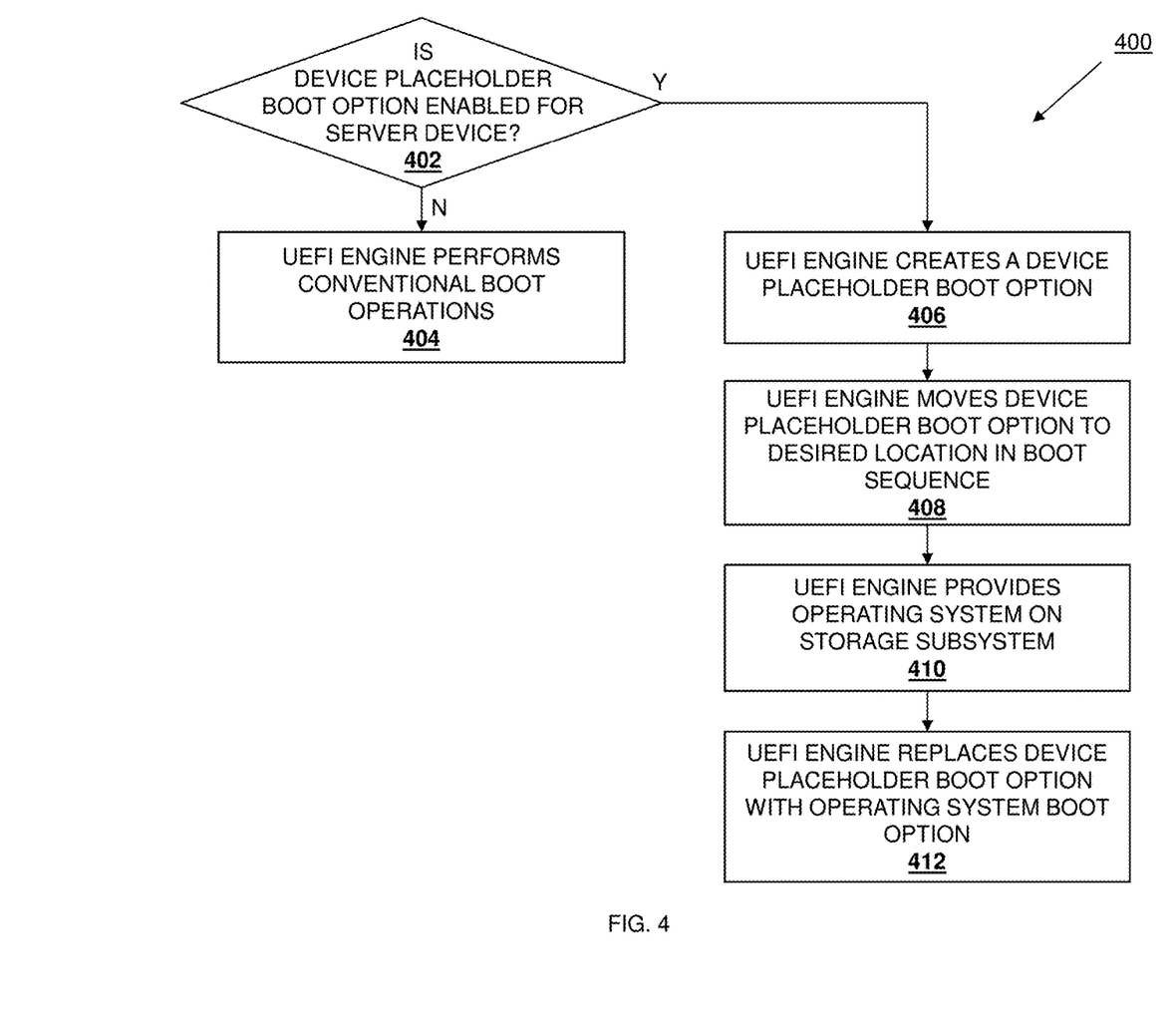
FIG. 4 is a flow chart illustrating an embodiment of a method for modifying boot options.

Referring now to FIG. 4, an embodiment of a method 400 for modifying boot options is illustrated. As discussed below, some embodiments of the systems and methods of the present disclosure do not follow the UEFI specification and industry-standard methods for automatically creating boot options for a fixed disk in a computing device based on the presence of a boot loader file in that computing device, and rather create a device placeholder boot option for a fixed disk based on its PCI device path, and provide that device placeholder boot option in a desired location in the boot sequence for the computing device. Subsequently, following the provisioning of an operating system on the computing device, the device placeholder boot option may be replaced (at the desired location in the boot sequence) by an operating system boot option that was provided on the computing device as a result of the provisioning of the operating system. As described herein, such functionality may be utilized to allow a user of a computing device to manipulate a fixed disk boot option for that computing device prior to a virtual disk being created on a RAID storage system in that computing device. Furthermore, this functionality may be extended to create the virtual disk on the RAID storage system in the computing device and manipulate the fixed disk boot option for that computing device during the same boot operation.

The method 400 begins at decision block 402 where it is determined whether a device placeholder boot option is enabled for a server device. In some embodiments, prior to decision block 402, the UEFI storage 306 may be provided with a system setup option for enabling the device placeholder boot option of the present disclosure. For example, a system setup option such as "System BIOS→Boot Settings→Hard Disk Drive Placeholder" may be available via the UEFI engine 304, and may be enabled by a manufacturer or user of the server device 300 that wishes to utilize the functionality described below. As such, prior to decision block 402, a manufacturer or user of the server device 300 may enable the device placeholder boot option, or may leave the device placeholder boot option disabled if they wish to have the UEFI engine 304 operate in a conventional manner, also described briefly below. However, in some embodiments, the device placeholder boot option may be automatically enabled (i.e., by the manufacturer of the server device 300 such that it must be disabled by a user of the server device 300 if that user wishes to have the UEFI engine 304 operate in a conventional manner). Furthermore, in yet other embodiments, the device placeholder boot option may be configured such that it may not be disabled, in which case decision block 402 and block 404 may be omitted from the method 400. Thus, at decision block 402 and in embodiments where the device placeholder boot option is configured to be enabled and/or disabled, the UEFI engine 304 may operate to determine whether the device placeholder boot option is enabled in the UEFI storage 306. For example, upon any boot of the server device 300 (e.g., the first PXE boot that is part of the PXE boot 1 phase and the second PXE boot that is part of the PXE boot 2 phase, discussed in further detail below), the UEFI engine 304 or other BIOS engine may perform decision block 402 to determine whether the device placeholder boot option is enabled by detecting a persistent setting in non-volatile memory that was set during the CFI phase and that enables the device placeholder boot option.

If, at decision block 402, it is determined that the device placeholder boot option is not enabled for the server device, the method 400 then proceeds to block 404 where the UEFI engine performs conventional boot operations. One of skill in the art in possession of the present disclosure will recognize that the UEFI engine 304 may perform a variety of conventional UEFI boot operations at block 404, and thus those conventional boot operations are not described in detail herein.

Figure 5:
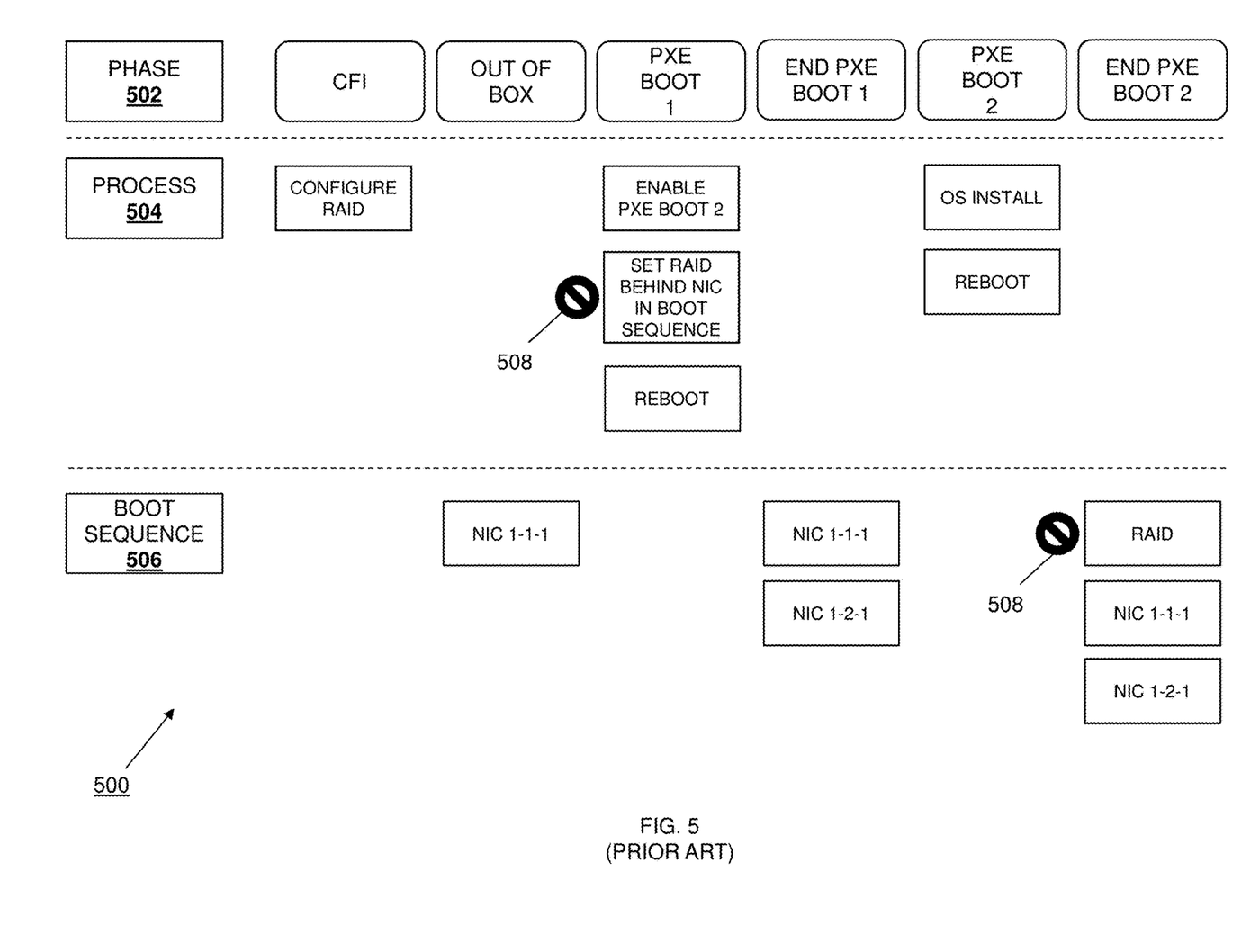
FIG. 5 is a process view illustrating an embodiment of a prior art boot process flow.

However, referring now to FIG. 5, a prior art boot process flow 500 is illustrated to provide an example of how a conventional boot process (which may be performed at block 404) may be limited for at least some of the reasons discussed above. In particular, the prior art boot process flow 500 illustrates how a conventional boot process may operate to prevent the positioning of a RAID boot option for the RAID storage subsystem 310 behind NIC boot option(s) for the communication subsystem 308 in the boot sequence of the server device 300, which may be desirable for server devices included in data centers that utilize PXE systems. In the illustrated embodiment, the boot process flow 500 includes a phase section 502 that details different phases of a specific boot process that includes a Custom Factory Integration (CFI) phase, an out-of-box phase, a PXE boot 1 phase, an end-of-PXE-boot-1 phase, a PXE boot 2 phase, and an end-of-PXE-boot-2 phase. One of skill in the art in possession of the present disclosure will recognize that the conventional boot process illustrated by the prior art boot process flow 500 is a two PXE boot process that includes a first boot (via a PXE system) for providing a hardware configuration on the server device 300, and a second boot (via the PXE system) for installing an operating system in the server device 300, and that other conventional boot processes will include different phases and/or omit some of the phases illustrated in FIG. 5. The boot process flow 500 also includes a process section 504 that describes processes occurring during the conventional boot process at each of the CFI phase, the PXE boot 1 phase, and the PXE boot 2 phase; as well as a boot sequence section 506 that provides the boot sequence for the server device at each of the out-of-box phase, the end-of-PXE-boot-1 phase, and the end-of-PXE-boot-2 phase.

As illustrated in FIG. 5, at the CFI phase the RAID storage subsystem 310 in the server device 300 may be configured by, for example, configuring a virtual disk in the RAID storage subsystem 310. As discussed above, following the CFI phase and at the out-of-box phase, the boot sequence 506 will only include a NIC 1 boot option for a PXE-enabled NIC ("NIC.Integrated.1-1-1") due to, for example, the communication subsystem 308 being the only bootable device in the server device 300 at this phase. At the PXE boot 1 phase, a first PXE boot is performed via the PXE system 206 and through the network 204, and that first PXE boot may be performed via the execution of a script set (e.g., including racadm/syscfg scripts) that provides for the configuration of hardware in the server device 300. As illustrated in FIG. 5, during the PXE boot 1 phase, a second PXE boot (discussed below) is enabled. FIG. 5 also illustrates how an attempt to set a RAID boot option for the RAID storage subsystem 310 behind the NIC 1 boot option for the PXE-enabled NIC will fail (as illustrated by element 508) because the RAID boot option is not present in the boot sequence for the server device 300 at the PXE boot 1 phase (i.e., the NIC 1 boot option for the PXE-enabled NIC is the only device boot option currently in the boot sequence for the server device 300 at this point in the boot process.) The PXE boot 1 phase ends when a reboot is performed, and at the end-of-PXE-boot-1 phase, the boot sequence 506 will include a NIC 2 boot option for the PXE-enabled NIC in addition to the NIC 1 boot option for the PXE-enabled NIC (e.g., a "NIC.Integrated.1-2-1" that was added to the boot sequence as part of the enablement of the second PXE boot during the PXE boot 1 phase, in addition to the "NIC.Integrated.1-1-1" that was part of the boot sequence at the out-of-box phase.)

At the PXE boot 2 phase, a second PXE boot (enabled during the PXE boot 1 phase, discussed above) is performed via the PXE system 206 and through the network 204, and that second PXE boot may be performed via the execution of a script set (e.g., including racadm/syscfg scripts) that provides for the installation of an operating system on the server device 300. As illustrated in FIG. 5, during the PXE boot 2 phase an operating system is installed, and the PXE boot 2 phase ends when a reboot is performed. At the end-of-PXE-boot-2 phase, the boot sequence 506 will include a RAID boot option for the RAID storage subsystem 310 positioned ahead of the NIC 1 boot option and the NIC 2 boot option for the PXE-enabled NIC (e.g., the "NIC.Integrated.1-1-1" and the "NIC.Integrated.1-2-1".) As discussed above, this positioning of the RAID boot option (i.e., in front of the NIC 1 boot option and the NIC 2 boot option) is due to the conventional operating system installer performing conventional operations to create the RAID boot option for the RAID storage subsystem 310 as part of the operating system installation, and move that RAID boot option to the top of the boot sequence so that the server device 300 will automatically boot using that RAID boot option on subsequent boots. However, FIG. 5 illustrates the RAID boot option at the top of the boot sequence 506 as a failure (as illustrated by element 510), as the implementation of the PXE system 206 in this embodiment makes it desirable to position the RAID boot option behind the NIC 1 boot option and the NIC 2 boot option in the boot sequence of the server device 300. Thus, conventional boot process flows result in failures (examples of which is detailed above) associated with desirable functionality for PXE systems.

If, at decision block 402, it is determined that the device placeholder boot option is enabled for the server device, the method 400 then proceeds to block 406 where the UEFI engine creates a device placeholder boot option. In an embodiment, at block 406, the UEFI engine 304 may operate to create a device placeholder boot option in the UEFI storage 306. For example, at block 402 the UEFI engine 304 may determine that the device placeholder boot option was enabled (e.g., during the CFI phase by the manufacturer of the server device 300 and, at block 406 and during a boot of the server device 300 (e.g., the first PXE boot during the PXE boot 1 phase discussed in further detail below, the UEFI engine 304 may create a boot option for the storage controller 309 (e.g., a RAID controller boot option, a hard disk controller boot option, etc.) that includes a device path that terminates at the storage controller 309 (e.g., the device placeholder boot option may point to a device path that terminates at a PCI node in the storage controller 309). As discussed in further detail below, and as will be appreciated by one of skill in the art in possession of the present disclosure, the device placeholder boot option including a device path that terminates at a PCI node in the storage controller 309 allows for the creation of a boot option based simply on the presence of the storage controller 309 in the server device 300, and does not require the presence of the storage subsystem 310 in the server device 300.

Figure 6:
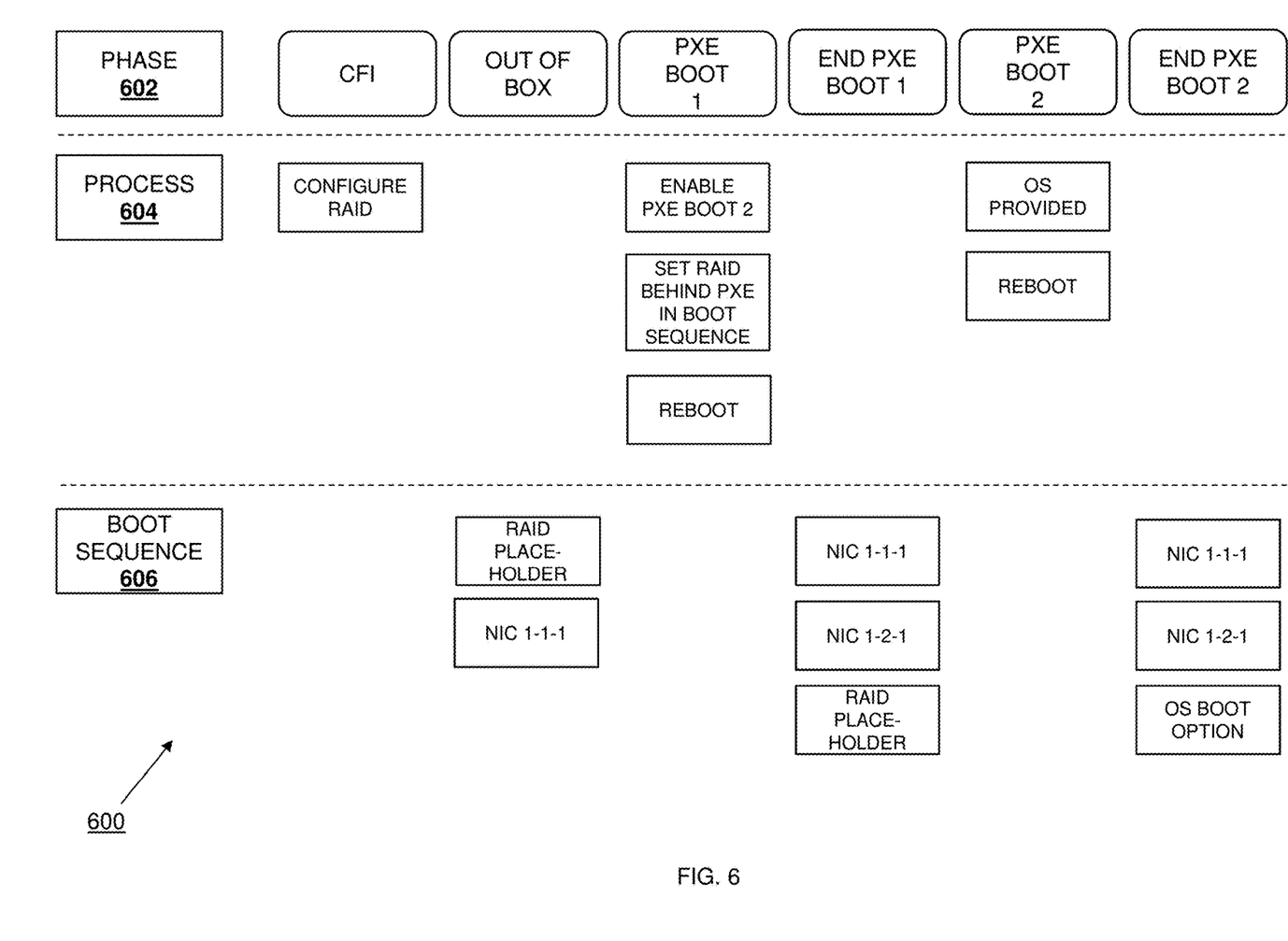
FIG. 6 is a process view illustrating an embodiment of a boot process flow according to the teachings of the present disclosure.

Referring now to FIG. 6, a boot process flow 600 according to the teachings of the present disclosure is illustrated. In particular, the boot process flow 600 illustrates how a boot process according to the teachings of the present disclosure may operate to allow the positioning of a RAID boot option for the RAID storage subsystem 310 behind NIC boot option(s) for the communication subsystem 308 in the boot sequence of the server device 300 when the RAID storage subsystem 310 has already been configured in the server device 300, which may be desirable for server devices included in data centers that utilize PXE systems. Similarly as discussed above with reference to the conventional boot process flow 500 of FIG. 5, the boot process flow 600 includes a phase section 602 that details different phases of a specific boot process that includes a Custom Factory Integration (CFI) phase, an out-of-box phase, a PXE boot 1 phase, an end-of-PXE-boot-1 phase, a PXE boot 2 phase, and an end-of-PXE-boot-2 phase. One of skill in the art in possession of the present disclosure will recognize that the boot process illustrated by the boot process flow 600 is a two PXE boot process that includes a first boot (via a PXE system) for providing a hardware configuration on the server device 300, and a second boot (via the PXE system) for installing an operating system in the server device 300, and that boot processes according to the teaching of the present disclosure may include different phases and/or omit some of the phases illustrated in FIG. 6. The boot process flow 600 also includes a process section 604 that describes processes occurring during the boot process at each of the CFI phase, the PXE boot 1 phase, and the PXE boot 2 phase; as well as a boot sequence section 606 that provides the boot sequence for the server device at each of the out-of-box phase, the end-of-PXE-boot-1 phase, and the end-of-PXE-boot-2 phase.

As illustrated in FIG. 6, at the CFI phase the RAID storage subsystem 310 in the server device 300 may be configured by, for example, configuring a virtual disk in the RAID storage subsystem 310. Following the determination at block 402 that the device placeholder boot option is enabled for the server device 300, the UEFI engine 304 operates to create the RAID placeholder boot option at block 406. As illustrated in FIG. 6, following the CFI phase and at the out-of-box phase, the boot sequence 606 will include a NIC 1 boot option for a PXE-enabled NIC ("NIC.Integrated.1-1-1") due to, for example, the communication subsystem 308 being a bootable device in the server device 300 at this phase, along with the RAID placeholder boot option positioned in front of the NIC 1 boot option in the boot sequence 606.

Figure 7:
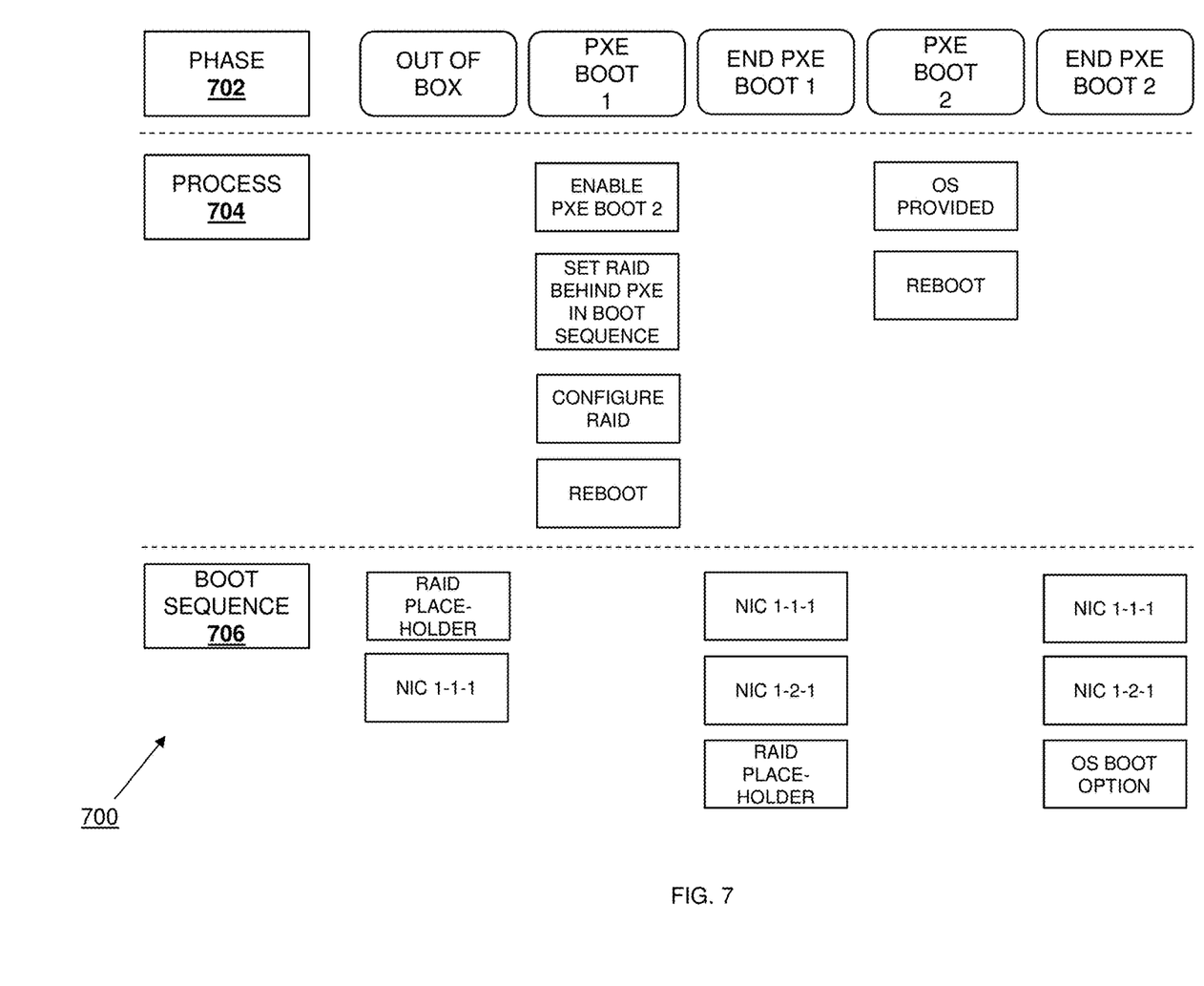
FIG. 7 is a process view illustrating an embodiment of a boot process flow according to the teachings of the present disclosure.

Referring now to FIG. 7, a boot process flow 700 according to the teachings of the present disclosure is illustrated. In particular, the boot process flow 700 illustrates how a boot process according to the teachings of the present disclosure may operate to allow the positioning of a RAID boot option for the RAID storage subsystem 310 behind NIC boot option(s) for the communication subsystem 308 in the boot sequence of the server device 300 prior to the configuration of the RAID storage subsystem 310 in the server device 300, which may be desirable for server devices included in data centers that utilize PXE systems. Similarly as discussed above with reference to the boot process flows 500 and 600 of FIGS. 5 and 6, respectively, the boot process flow 700 includes a phase section 702 that details different phases of a specific boot process that includes an out-of-box phase, a PXE boot 1 phase, an end-of-PXE-boot-1 phase, a PXE boot 2 phase, and an end-of-PXE-boot-2 phase. One of skill in the art in possession of the present disclosure will recognize that the boot process illustrated by the boot process flow 700 is a two PXE boot process that includes a first boot (via a PXE system) for providing a hardware configuration on the server device 300, and a second boot (via the PXE system) for installing an operating system in the server device 300, and that boot processes according to the teaching of the present disclosure may include different phases and/or omit some of the phases illustrated in FIG. 7. The boot process flow 700 also includes a process section 704 that describes processes occurring during the boot process at each of the PXE boot 1 phase and the PXE boot 2 phase; as well as a boot sequence section 706 that provides the boot sequence for the server device at each of the out-of-box phase, the end-of-PXE-boot-1 phase, and the end-of-PXE-boot-2 phase.

Following the determination at block 402 that the device placeholder boot option is enabled for the server device 300, the UEFI engine 304 operates to create the RAID placeholder boot option at block 406. As illustrated in FIG. 7, following the out-of-box phase, the boot sequence 706 will include a NIC 1 boot option for a PXE-enabled NIC ("NIC.Integrated.1-1-1") due to, for example, the communication subsystem 308 being a bootable device in the server device 300 at this phase, along with the RAID placeholder boot option positioned in front of the NIC 1 boot option in the boot sequence 706. Thus, the RAID placeholder boot option may be created at block 406 and provided in the boot sequence 706 for the server device 300 prior to the configuration of the RAID storage subsystem 310 (e.g., prior to the configuration of a virtual disk on the RAID storage subsystem 310.) Furthermore, one of skill in the art in possession of the present disclosure will recognize that device placeholder boot options may be created at block 406 and provided in the boot sequence 706 prior to the connection or coupling of the storage subsystem 310 to the storage controller 309 in the server device 300, and/or prior to the provisioning of a boot loader file in the server device 300 (e.g., the provisioning of an EFI file, a boot file, a BootX64.efi file, and/or other boot loader files in a non-removable BlockIO device that is published by the storage subsystem 310.)

The method 400 then proceeds to block 408 where the UEFI engine moves the device placeholder boot option to a desired location in a boot sequence. In an embodiment, at block 408, the UEFI engine 304 may operate to move the device placeholder boot option to a desired location in a boot sequence for the server device 300 during a first boot of the server device 300 that is based on first boot instructions. In the embodiments discussed below, the first boot instructions that provide for the first boot of the server device 300 are received through the network 204 from the PXE system 206. However, one of skill in the art in possession of the present disclosure will recognize that the first boot instructions may be received in a variety of different manners (e.g., the first boot instructions may be received from a removable storage device (e.g., a Universal Serial Bus (USB) device) coupled to the server device 300, and/or other storage devices capable of storing the first boot instructions) while remaining within the scope of the present disclosure as well.

With reference to the boot process flow illustrated in FIG. 6, the first boot of the server device 300 may be a first PXE boot that occurs at the PXE boot 1 phase via the PXE system 206 and through the network 204, and the first PXE boot may be performed via the execution of a script set (e.g., including racadm/syscfg scripts) that provides for the configuration of hardware in the server device 300. As illustrated in FIG. 6, during the PXE boot 1 phase, a second PXE boot (discussed below) is enabled. At block 408, the UEFI engine 304 operates to move the RAID placeholder boot option behind the boot option(s) for the communication subsystem 308 in the boot sequence 606 for the server device 300, which does not result in a failure (as detailed with reference to FIG. 5 above) because the RAID placeholder boot option is present in the boot sequence at this phase of the boot process. While the device placeholder boot option is illustrated and described as being positioned last night the boot sequence 606 for the server device 300 in this PXE system embodiment, one of skill in the art in possession of the present disclosure will recognize that the device placeholder boot option may be positioned at any desired location in the boot sequence 606 of the server device 300 while remaining within the scope of the present disclosure. The PXE boot 1 phase ends when a reboot is performed, and at the end-of-PXE-boot-1 phase, the boot sequence 606 will include a NIC 2 boot option for the PXE-enabled NIC in addition to the NIC 1 boot option for the PXE-enabled NIC (e.g., a "NIC.Integrated.1-2-1" that was added to the boot sequence as part of the enablement of the second PXE boot during the PXE boot 1 phase, in addition to the "NIC.Integrated.1-1-1" that was part of the boot sequence at the out-of-box phase), along with the RAID placeholder boot option positioned behind each of the NIC 1 boot option and the NIC 2 boot option.

With reference to the boot process flow illustrated in FIG. 7, the first boot of the server device 300 may be a first PXE boot that occurs at the PXE boot 1 phase via the PXE system 206 and through the network 204, and the first PXE boot may be performed via the execution of a script set (e.g., including racadm/syscfg scripts) that provides for the configuration of hardware in the server device 300. As illustrated in FIG. 7, during the PXE boot 1 phase, a second PXE boot (discussed below) is enabled. At block 408, the UEFI engine 304 operates to move the RAID placeholder boot option behind the boot option(s) for the communication subsystem 308 in the boot sequence 606 for the server device 300, which does not result in a failure (as detailed with reference to FIG. 5 above) because the RAID placeholder boot option is present in the boot sequence at this phase of the boot process. While the device placeholder boot option is illustrated and described as being positioned last night the boot sequence 706 for the server device 300 in this PXE system embodiment, one of skill in the art in possession of the present disclosure will recognize that the device placeholder boot option may be positioned at any desired location in the boot sequence 706 of the server device 300 while remaining within the scope of the present disclosure. In addition, at the PXE boot 1 phase, the RAID storage subsystem 310 may be configured by configuring a virtual disk in the RAID storage subsystem 310, an operation that may be performed subsequent to the creation of the RAID boot option and the positioning of the RAID boot option in the desired location in the boot sequence 706 for the server device 300. The PXE boot 1 phase ends when a reboot is performed, and at the end-of-PXE-boot-1 phase, the boot sequence 706 will include a NIC 2 boot option for the PXE-enabled NIC in addition to the NIC 1 boot option for the PXE-enabled NIC (e.g., a "NIC.Integrated.1-2-1" that was added to the boot sequence as part of the enablement of the second PXE boot during the PXE boot 1 phase, in addition to the "NIC.Integrated.1-1-1" that was part of the boot sequence at the out-of-box phase), along with the RAID placeholder boot option positioned behind each of the NIC 1 boot option and the NIC 2 boot option.

The method 400 then proceeds to block 410 where the UEFI engine provides an operating system on the storage device. In an embodiment, at block 410, the UEFI engine 304 may operate to provide an operating system on the server device 300 during a second boot of the server device 300 that is based on second boot instructions. In the embodiments discussed below, the second boot instructions that provide for the second boot of the server device 300 are received through the network 204 from the PXE system 206. However, one of skill in the art in possession of the present disclosure will recognize that the second boot instructions may be received in a variety of different manners (e.g., the second boot instructions may be received from a removable storage device (e.g., a Universal Serial Bus (USB) device) coupled to the server device 300, and/or other storage devices capable of storing the second boot instructions) while remaining within the scope of the present disclosure as well.

With reference to the boot process flows illustrated in FIGS. 6 and 7, the second boot of the server device 300 may be a second PXE boot that occurs at the PXE boot 2 phase via the PXE system 206 and through the network 204, and the second PXE boot may be performed via the execution of a script set (e.g., including racadm/syscfg scripts) that provides for the performance of an operating system installation process that provides for the installation of an operating system in the server device 300. However, in other embodiments, the operating system may be provided on the server device 300 as part of an operating system copying process (e.g., as part of a General Hardware-Oriented System Transfer (GHOST) process and/or other disk cloning process that would be apparent to one of skill in the art in possession of the present disclosure) while remaining within the scope of the present disclosure as well. As illustrated in FIGS. 6 and 7, during the PXE boot 2 phase, an operating system is provided on the server device 300. For example, in embodiments in which the operating system is installed on the server device 300, at block 410 an operating system installer may create a RAID boot option for the RAID storage system 310 which, as discussed above, is conventionally positioned at the stop of the boot sequence 606 for the server device 300. In another example, in embodiments in which the operating system is copied to the server device 300 (e.g., via the GHOST process or other disk cloning process discussed above), at block 410 the UEFI engine 304 (or other BIOS engine) may create boot loader file boot option pointing to a boot loader file (e.g., BootX64.efi) that was copied to the server device 300.

The method 400 then proceeds to block 412 where the UEFI engine replaces the device placeholder boot option with an operating system boot option. In an embodiment, at block 412, the UEFI engine 304 operates to replace the device placeholder boot option with an operating system boot option that was provided on the server device 300 in response to the provisioning of the operating system on the server device 300. As discussed above, in embodiments in which the operating system is installed on the server device 300, an operating system installer may create a RAID boot option for the RAID storage system 310. With reference to FIGS. 6 and 7, at block 410 the UEFI engine 304 may replace the RAID placeholder boot option with the operating-system-created RAID boot option such that the operating-system-created RAID boot option is located in the desired location in the boot sequence 606/706 in which the RAID placeholder boot option was positioned at block 408 (e.g., behind each of the NIC 1 boot option and the NIC 2 boot option in the illustrated embodiment.) As also discussed above, in embodiments in which the operating system is copied to the server device 30, the UEFI engine 304 (or other BIOS engine) may create a boot loader file boot option pointing to a boot loader file. With reference to FIGS. 6 and 7, at block 410 the UEFI engine 304 may replace the RAID placeholder boot option with the UEFI/BIOS-engine-created boot loader file boot option such that the UEFI/BIOS-engine-created boot loader file boot option is located in the desired location in the boot sequence 606/706 in which the RAID placeholder boot option was positioned at block 408 (e.g., behind each of the NIC 1 boot option and the NIC 2 boot option in the illustrated embodiment.)

Thus, systems and methods have been described that provide for the creation of a RAID placeholder boot option for a RAID based on its device path (e.g., pointing to a PCI node in its RAID storage controller), and provide that RAID placeholder boot option in a desired location in the boot sequence for the server device. Subsequently, following the provisioning of an operating system on the server device, the RAID placeholder boot option may be replaced (at the desired location in the boot sequence) by an operating system boot option that was provided on the server device as a result of the provisioning of the operating system. Such functionality may be utilized to allow a user of a server device to manipulate a fixed disk boot option for that server device prior to a virtual disk being created on the RAID storage system in that server device, which provides for the omission of a server device reboot in both local (e.g., USB device enabled) and remote (e.g., via scripts provided from a PXE system) operating system installations. Furthermore, this functionality may be extended to create the virtual disk on the RAID storage system in the server device and manipulate the fixed disk boot option for that server device during the same boot operation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A boot option system, comprising:
a plurality of server devices, wherein each of the plurality of server devices is configured to:
create, prior to provisioning an operating system on that server device, a device placeholder boot option that includes a device path terminating at a server subsystem in that server device;
move, prior to provisioning the operating system on that server device and during a first boot of that server device, the device placeholder boot option to a desired location within a boot sequence for that server device;
provide, during a second boot of that server device that is subsequent to the first boot, the operating system on that server device; and
replace, at the desired location within the boot sequence for that server device, the device placeholder boot option with an operating system boot option that was provided on that server device in response to the provisioning of the operating system on that server device.

2. The system of claim 1, wherein each of the plurality of server devices is configured to:
determine that the device placeholder boot option for that server device is enabled, wherein the device placeholder boot option is created in response to determining that the device placeholder boot option is enabled for that server device.

3. The system of claim 1, wherein the operating system is provided on each of the plurality of server devices using an operating system copying process, and wherein the operating system boot option is copied to each of the plurality of server devices as part of the operating system copying process.

4. The system of claim 1, wherein the operating system is provided on each of the plurality of server devices using an operating system installation process, and wherein the operating system boot option is created on each of the plurality of server devices as part of the operating system installation process.

5. The system of claim 1, wherein the device placeholder boot option is created before a virtual disk has been provided on each of the plurality of server devices.

6. The system of claim 1, wherein the device placeholder boot option is created before a boot loader file has been provided on each of the plurality of server devices.

7. An Information Handling System (IHS), comprising:
a processing system; and
a memory system that is coupled to the processing system and that includes instructions that, when executed by the processing system, cause the processing system to provide a Universally Extensible Firmware Interface (UEFI) engine that is configured to:
create, prior to provisioning of an operating system on the IHS, a device placeholder boot option that includes a device path terminating at an IHS subsystem;
move, prior to provisioning of the operating system on the IHS and during a first boot, the device placeholder boot option to a desired location within a boot sequence;
provide, during a second boot that is subsequent to the first boot, an operating system on the IHS; and
replace, at the desired location within the boot sequence, the device placeholder boot option with an operating system boot option that was provided on the IHS in response to the provisioning of the operating system on the IHS.

8. The IHS of claim 7, wherein the UEFI engine is configured to:
determine that the device placeholder boot option is enabled, wherein the device placeholder boot option is created in response to determining that the device placeholder boot option is enabled.

9. The IHS of claim 7, wherein the operating system is provided using an operating system copying process, and wherein the operating system boot option is copied to the IHS as part of the operating system copying process.

10. The IHS of claim 7, wherein the operating system is provided using an operating system installation process, and wherein the operating system boot option is created on the IHS as part of the operating system installation process.

11. The IHS of claim 7, wherein the device placeholder boot option is created before a virtual disk has been provided in the IHS.

12. The IHS of claim 7, wherein the device placeholder boot option is created before a boot loader file has been provided on the IHS.

13. The IHS of claim 7, wherein the device placeholder boot option is created before a storage system in the IHS is coupled to a storage controller in the IHS.

14. A method for providing a boot option, comprising:
creating, by a computing device prior to provisioning an operating system on the computing device, a device placeholder boot option that includes a device path terminating at a computing subsystem in the computing device;
moving, by the computing device prior to provisioning the operating system on the computing device during a first boot, the device placeholder boot option to a desired location within a boot sequence for the computing device;
providing, by the computing device during a second boot that is subsequent to the first boot, the operating system on the computing device; and
replacing, by the computing device at the desired location within the boot sequence, the device placeholder boot option with an operating system boot option that was provided on the computing device in response to the provisioning of the operating system on the computing device.

15. The method of claim 14, further comprising:
determining, by the computing device, that the device placeholder boot option is enabled for the computing device, wherein the device placeholder boot option is created in response to determining that the device placeholder boot option is enabled for the computing device.

16. The method of claim 14, wherein the operating system is provided using an operating system copying process, and wherein the operating system boot option is copied to the computing device as part of the operating system copying process.

17. The method of claim 14, wherein the operating system is provided using an operating system installation process, and wherein the operating system boot option is created on the computing device as part of the operating system installation process.

18. The method of claim 14, wherein the device placeholder boot option is created before a virtual disk has been provided on the computing device.

19. The method of claim 14, wherein the device placeholder boot option is created before a boot loader file has been provided on the computing device.

20. The method of claim 14, wherein the device placeholder boot option is created before a storage system in the computing device has been coupled to a storage controller in the computing device.

* * * * *